United States Patent
Soukup

(10) Patent No.: US 7,917,649 B2
(45) Date of Patent: Mar. 29, 2011

(54) TECHNIQUE FOR MONITORING SOURCE ADDRESSES THROUGH STATISTICAL CLUSTERING OF PACKETS

(75) Inventor: Martin Soukup, Ottawa (CA)

(73) Assignee: Nortel Networks Limited, Mississauga, Ontario (CA)

( * ) Notice: Subject to any disclaimer, the term of this patent is extended or adjusted under 35 U.S.C. 154(b) by 1154 days.

(21) Appl. No.: 10/739,299

(22) Filed: Dec. 19, 2003

(65) Prior Publication Data

US 2005/0138201 A1 Jun. 23, 2005

(51) Int. Cl.
*G06F 15/173* (2006.01)

(52) U.S. Cl. ............... 709/238; 709/223; 709/224

(58) Field of Classification Search .......... 709/238, 709/223, 224; 711/104, 105, 113, 114, 117, 711/118, 119, 122, 126
See application file for complete search history.

(56) References Cited

U.S. PATENT DOCUMENTS

| | | | | |
|---|---|---|---|---|
| 5,920,278 | A * | 7/1999 | Tyler et al. | 342/33 |
| 6,473,425 | B1 * | 10/2002 | Bellaton et al. | 370/392 |
| 6,484,125 | B1 * | 11/2002 | Huang et al. | 702/183 |
| 6,829,651 | B1 * | 12/2004 | Bass et al. | 709/238 |
| 2002/0032773 | A1 * | 3/2002 | Jiang | 709/225 |
| 2003/0058859 | A1 * | 3/2003 | Wu et al. | 370/392 |
| 2003/0145232 | A1 * | 7/2003 | Poletto et al. | 713/201 |
| 2004/0054925 | A1 * | 3/2004 | Etheridge et al. | 713/201 |
| 2004/0193943 | A1 * | 9/2004 | Angelino et al. | 714/4 |

OTHER PUBLICATIONS

Stefan Savage, David Wetherall, Anna Karlin and Tom Anderson, "Practical Network Support for IP Traceback," SIGCOMM'00, Stockholm, Sweden.

Cheng Jin, Haining Wang and Kang G. Shin, "Hop-Count Filtering: An Effective Defense Agaiast Spoofed DDoS Traffic," Proceedings of the $10^{th}$ ACM conference on computer and communication security, pp. 30-41.

T. Peng, C. Leckie and K. Ramamohanarao, "Detecting Distributed Denial of Service Attacks Using Source IP Address Monitoring," The University of Melbourne—Dept. of Electrical and Electronic Engineering Technical Report, Nov. 2002.

T. Peng, C. Leckie and K. Ramamohanarao, "Detecting Distributed Denial of Service Attacks by Sharing Distributed Beliefs," $8^{th}$ Australasian Conference on Information Security and Privacy, Wollongong, Australia, Jul. 2003.

Sven Dietrich, "Scalpel, Gauze, and Decompilers Dissecting Denial of Service (DDoS)," ;Iogin: The Magazine of Usenix & Sage, Nov. 2000, vol. 25, No. 7, pp. 52-55.

J. Li, J. Mirkovic, M. Wang, P. Reiher, and L. Zhang, "SAVE: Source Address Validity Enforcement Protocol," INFOCOM 2002.

(Continued)

*Primary Examiner* — Barbara N Burgess
(74) *Attorney, Agent, or Firm* — Hunton & Williams, LLP

(57) ABSTRACT

A technique for monitoring source addresses through statistical clustering of packets is disclosed. In one particular exemplary embodiment, the technique may be realized by a method for monitoring source addresses through statistical clustering of packets. The method may comprise identifying at least part of a source address of a packet. The method may also comprise searching at least one recorded source address based on the at least part of the source address, the at least one recorded source address being organized into at least one cluster. The method may further comprise routing the packet if the at least part of the source address falls within one of the at least one cluster and the one of the at least one cluster contains at least a predetermined number of source addresses.

18 Claims, 3 Drawing Sheets

OTHER PUBLICATIONS

D. Fasulo, "An Analysis of Recent Work on Clustering Algorithms," University of Washington—Department of Computer Science & Engineering Technical Report # 01-03-02, Apr. 26, 1999.

Al Reuben, "Re: Average and median IP packet size over the Internet?" found at http://www.cctec.com/maillists/nanog/historical/9804/msg00547.html.

* cited by examiner

TECHNIQUE FOR MONITORING SOURCE ADDRESSES THROUGH STATISTICAL CLUSTERING OF PACKETS

FIELD OF THE INVENTION

The present invention relates generally to computer and communications networks and, more particularly, to a technique for monitoring source addresses through statistical clustering of packets.

BACKGROUND OF THE INVENTION

Denial of Service (DoS) attacks, especially Distributed Denial of Service (DDoS) attacks, pose a serious threat to the availability of internet services. DoS attacks typically consume the resources of a remote host or network, thereby limiting and/or blocking legitimate users' access. Such attacks can result in significant loss of time and money for many organizations.

DDoS attacks are among the hardest network security problems because they are simple to implement, difficult to prevent, and very difficult to trace. In order to conceal the origins of attacks and to coax uncompromised hosts into becoming reflectors, DDoS attackers typically spoof their IP packets by randomizing the source address fields. Further, an attacker need not be operating from a single machine; he may be able to coordinate several machines on different networks to launch the attacks.

Many solutions have been proposed to prevent and/or trace DDOS attacks. However, these solutions suffer from a number of deficiencies. For example, some solutions propose new protocols or mechanisms to be implemented on all network routers, which is difficult to achieve. Most statistical methods tend to produce a significant number of false positives, therefore are only suitable for tracing instead of prevention of DoS attacks.

In view of the foregoing, it would be desirable to provide a technique for preventing and/or tracing DoS attacks which overcomes the above-described inadequacies and shortcomings.

SUMMARY OF THE INVENTION

According to the present invention, a technique for monitoring source addresses through statistical clustering of packets is provided. In one particular exemplary embodiment, the technique may be realized by/as a method for monitoring source addresses through statistical clustering of packets. The method may comprise identifying at least part of a source address of a packet. The method may also comprise searching at least one recorded source address based on the at least part of the source address, the at least one recorded source address being organized into at least one cluster. The method may further comprise routing the packet if the at least part of the source address falls within one of the at least one cluster, and the one of the at least one cluster contains at least a predetermined number of source addresses.

In accordance with other aspects of this particular exemplary embodiment, the method may comprise discarding the packet if the one of the at least one cluster contains less than the predetermined number of source addresses.

In accordance with further aspects of this particular exemplary embodiment, the method may comprise creating a new cluster centered around the at least part of the source address and discarding the packet if the at least part of the source address does not fall within any of the at least one cluster.

In accordance with additional aspects of this particular exemplary embodiment, the at least one recorded source address may be recorded in at least one hierarchical data structure.

In accordance with another aspect of this particular exemplary embodiment, the at least one recorded source address may be linked to the at least one cluster via pointers or references.

In accordance with yet another aspect of this particular exemplary embodiment, the at least part of the source address is within a cluster if the at least part of the source address is no more than two standard deviations away from a mean of the cluster.

In accordance with still another aspect of this particular exemplary embodiment, the method may further comprise updating the one of the at least one cluster by including the at least part of the source address in the one of the at least one cluster, recalculating a mean and a standard deviation for the one of the at least one cluster, and reorganizing the at least part of the source address and the at least one recorded source addresses based on the recalculated mean and standard deviation. The method may further comprise issuing a warning if the updated cluster has an increased standard deviation. And the method may further comprise limiting the standard deviation to be no less than a predetermined standard deviation value. In addition, the new cluster may be created based on the predetermined standard deviation value.

In accordance with a further aspect of this particular exemplary embodiment, the method may comprise discarding at least one of the at least one cluster, where the at least one of the at least one cluster contains less than the predetermined number of source addresses and has not been updated in a predetermined time period.

In accordance with a still further aspect of this particular exemplary embodiment, the source address of the packet may be an internet protocol (IP) address. The at least one cluster may have a minimum standard deviation value of 128. And the new cluster may be created based on the minimum standard deviation value.

In accordance with another particular exemplary embodiment, the technique may be realized by at least one signal embodied in at least one carrier wave for transmitting a computer program of instructions configured to be readable by at least one processor for instructing the at least one processor to execute a computer process for performing the method as recited above.

In accordance with yet another particular exemplary embodiment, the technique may be realized by at least one processor readable carrier for storing a computer program of instructions configured to be readable by at least one processor for instructing the at least one processor to execute a computer process for performing the method as recited above.

In accordance with still another particular exemplary embodiment, the technique may be realized by/as a system for monitoring source addresses through statistical clustering of packets. The system may comprise a storage module that records at least one source address, where the at least one source address is organized into at least one cluster. The system may also comprise a processor module that identifies at least part of a source address of a packet, queries the storage module based on the at least part of the source address, and routes the packet if the at least part of the source address falls within one of the at least one cluster and the one of the at least one cluster contains at least a predetermined number of source addresses.

In accordance with other aspects of this particular exemplary embodiment, the processor module may discard the packet if the one of the at least one cluster contains less than the predetermined number of source addresses.

In accordance with other aspects of this particular exemplary embodiment, the processor module may create a new cluster centered around the at least part of the source address and discards the packet if the at least part of the source address does not fall within any of the at least one cluster.

In accordance with a further particular exemplary embodiment, the technique may be realized by/as a system for monitoring source addresses through statistical clustering of packets. The system may comprise means for identifying at least part of a source address of a packet. The system may also comprise means for querying at least one recorded source address based on the at least part of the source address, where the at least one recorded source address is organized into at least one cluster. The system may further comprise means for routing the packet if the at least part of the source address falls within one of the at least one cluster and the one of the at least one cluster contains at least a predetermined number of source addresses.

The present invention will now be described in more detail with reference to exemplary embodiments thereof as shown in the accompanying drawings. While the present invention is described below with reference to exemplary embodiments, it should be understood that the present invention is not limited thereto. Those of ordinary skill in the art having access to the teachings herein will recognize additional implementations, modifications, and embodiments, as well as other fields of use, which are within the scope of the present invention as disclosed and claimed herein, and with respect to which the present invention could be of significant utility.

BRIEF DESCRIPTION OF THE DRAWINGS

In order to facilitate a fuller understanding of the present invention, reference is now made to the accompanying drawings, in which like elements are referenced with like numerals. These drawings should not be construed as limiting the present invention, but are intended to be exemplary only.

DETAILED DESCRIPTION OF EXEMPLARY EMBODIMENT(S)

Figure 1:
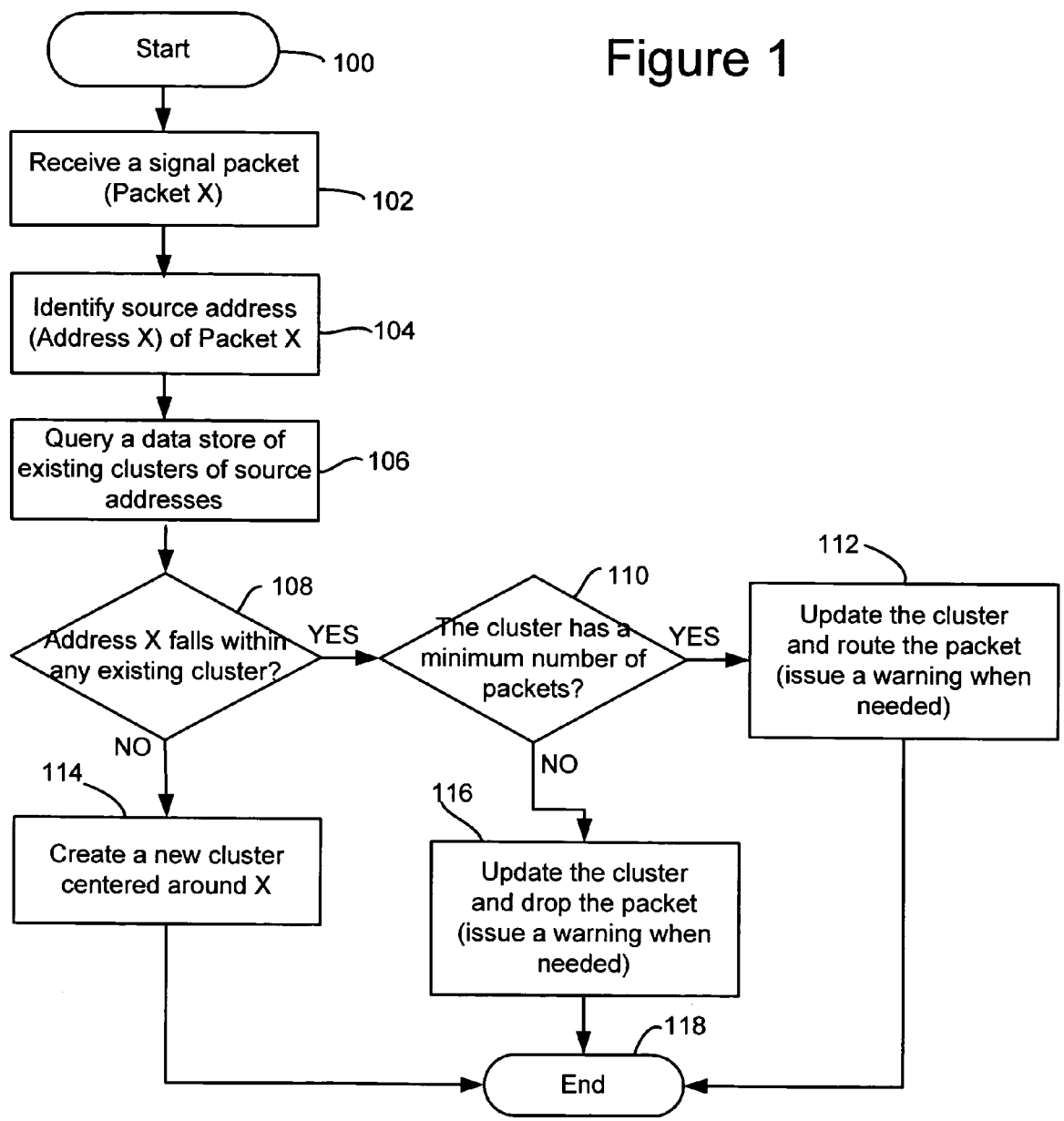
FIG. 1 is a flow chart illustrating an exemplary method for monitoring source addresses through statistical clustering of packets in accordance with an embodiment of the present invention.

Referring to FIG. 1, there is shown a flow chart illustrating an exemplary method for monitoring source addresses through statistical clustering of packets in accordance with an embodiment of the present invention.

The exemplary method starts in step 100.

In step 102, a signal packet may be received by a network element. The network element may be a computer, a server, or a content-aware switch/router having one or more connections to a computer and/or communications network. For illustration purposes, the exemplary method will be described with reference to Internet Protocol Version 4 (IPv4) though the method should be applicable to other communication protocols and future versions of Internet Protocols including IPv6. Also for illustration purposes, the signal packet is hereinafter referred to as "Packet X."

In step 104, at least part of a source address of Packet X may be identified. The source address may be an identifier string or number, embedded in the packet, that identifies the origin (or sender) of the packet. For example, the source IP address of an IPv4 packet may be extracted from a 32-bit "source address" field in the packet's header. However, if the packet has been spoofed by a DDOS attacker, the source address may not reflect the true origin of the packet. Depending on network security requirements and/or available resources, a partial or full source address may be necessary. The partial or full source address of Packet X is hereinafter referred to as "Address X."

In step 106, a data store of existing clusters of source addresses may be queried. According to embodiments of the invention, the network element may maintain a data store of source addresses of packets it has received within a predetermined time period. The data store may be an in-memory type that accommodates high-speed access. The stored source addresses are typically organized in a hierarchical data structure and grouped into statistical clusters. A statistical cluster may comprise a plurality of source addresses that are within one another's vicinity. Addresses in a cluster may have a distribution that centers around a mean value and spreads out with a standard deviation. The statistical clusters are created, updated and/or eliminated based on a plurality of rules as set forth below.

The hierarchical data structure in which the source addresses are recorded may involve the use of hierarchical trees or tables together with data links or pointers. For example, in IPv4, the recorded source IP addresses may be organized based on their subnet classes. One example of the data store records is shown in Table 1. In Table 1, the first row records the Class A Subnet values; the second row records the Class B Subnet values based on their Class A classification; the third row records the Class C Subnet values based on their Class A and Class B classification; and the fourth row records a pointer that indicates to which cluster the IP address belongs. Table 1 may be built to reflect full IP addresses if desired. For example, if a router is small and/or covers a limited range of traffic, it may be configured to keep track of full IP addresses and their clusters. If that is the case, a pointer value may be assigned to each full address in the data store.

TABLE 1

Exemplary Data Store Records of Source IP Addresses.

| Class A Subnet | 47 | | | | 129 | |
| --- | --- | --- | --- | --- | --- | --- |
| Class B Subnet | 127 | 127 | 128 | ... | 15 | 86 |
| Class C Subnet | 5 | 185 | 32 | ... | 66 | 67 | 96 |
| Pointer | Cluster II | Cluster II | Cluster II | ... | Cluster V | Cluster V | Cluster XI |

In step 108, it may be determined whether Address X falls within any existing cluster. According to one embodiment of the invention, an address is considered within a cluster if the address is no more than two standard deviations away from the mean of the cluster. The above-described hierarchical data structure may also be utilized in an efficient determination of where an address belongs. If Address X is within an existing cluster (e.g., Cluster Y), the process may branch to step 110.

Otherwise, the process may branch to step 114. If the network element has just started operating (e.g., after being reset), no packet may have been recorded and therefore no cluster exists. In such a start-up state, Address X may be considered not within an existing cluster and the process may branch to step 114.

In step 110, it may be determined whether Cluster Y has a minimum number of addresses. According to embodiments of the invention, it may be mandated that a minimum number of packets must be found in a cluster before any subsequent packets that fall within the cluster can be routed. In other words, at least a predetermined number of packets must have originated from relatively similar source addresses (a cluster) before the network element can ascertain the legitimacy of the cluster. This restriction may effectively block attacks with spoofed addresses since DoS or DDOS attackers typically do not re-use the same source address for multiple packets. On the other hand, this restriction has a minimal impact on legitimate network traffic because most network clients (e.g., IP clients) will re-send the packets a few more times if the first packet fails. In addition, a consistent source address usage would aid tracing of the real source addresses.

If it is determined in step 110 that Cluster Y already has a minimum number of addresses, the process may branch to step 112 where Cluster Y may be updated and Packet X may be routed to its destination. Updating Cluster Y may include the steps of (1) recalculating the mean and standard deviation of Cluster Y based on the addition of Address X; (2) setting the pointers or references of all the addresses within the new boundaries of Cluster Y to point to Cluster Y.

According to embodiments of the invention, if the standard deviation recalculation increases the size of Cluster Y, a warning may be issued for traceability purposes. The warning issued may be recorded in a read-only medium. If the size of a cluster increases so much that it starts to overlap a neighboring cluster, the two overlapping clusters may be merged to form a new cluster with an updated mean and standard deviation. The pointers of those source addresses that fall within this new cluster may be updated accordingly.

According to another embodiment of the invention, if the standard deviation recalculation decreases the size of Cluster Y, those source addresses that happen to fall outside the shrunk cluster may be set to point to no cluster. Optionally, a warning may be issued. A "minimum size" restriction may be imposed on the clusters so that their sizes (or standard deviations) never fall below a predetermined value. For example, in IPv4, a restriction may be imposed that a cluster's standard deviation be no less than half a subnet (i.e., 128). If a recalculated standard deviation falls below 128, the cluster's standard deviation may be set as 128.

If Cluster Y does not have the required minimum number of addresses, the process may branch to step 116 where Cluster Y is updated in a similar way as described above. However, Packet X is discarded without being routed.

If Address X does not fall within any existing cluster, as determined above in step 108, then, in step 114, a new cluster may be created to center around Address X. According to one embodiment of the invention, the above-mentioned "minimum size" restriction may be imposed at the initiation of a new cluster. For example, in IPv4, a new cluster may be created with Address X as the mean and 128 as the standard deviation.

The exemplary method ends in step 118. This method may be repeated for each incoming packet at a network node. Additional maintenance of the clusters is described below in connection with FIG. 2. The additional maintenance process may be implemented in a parallel fashion concurrent with the above-described exemplary method as will be appreciated by those skilled in the art.

Figure 2:
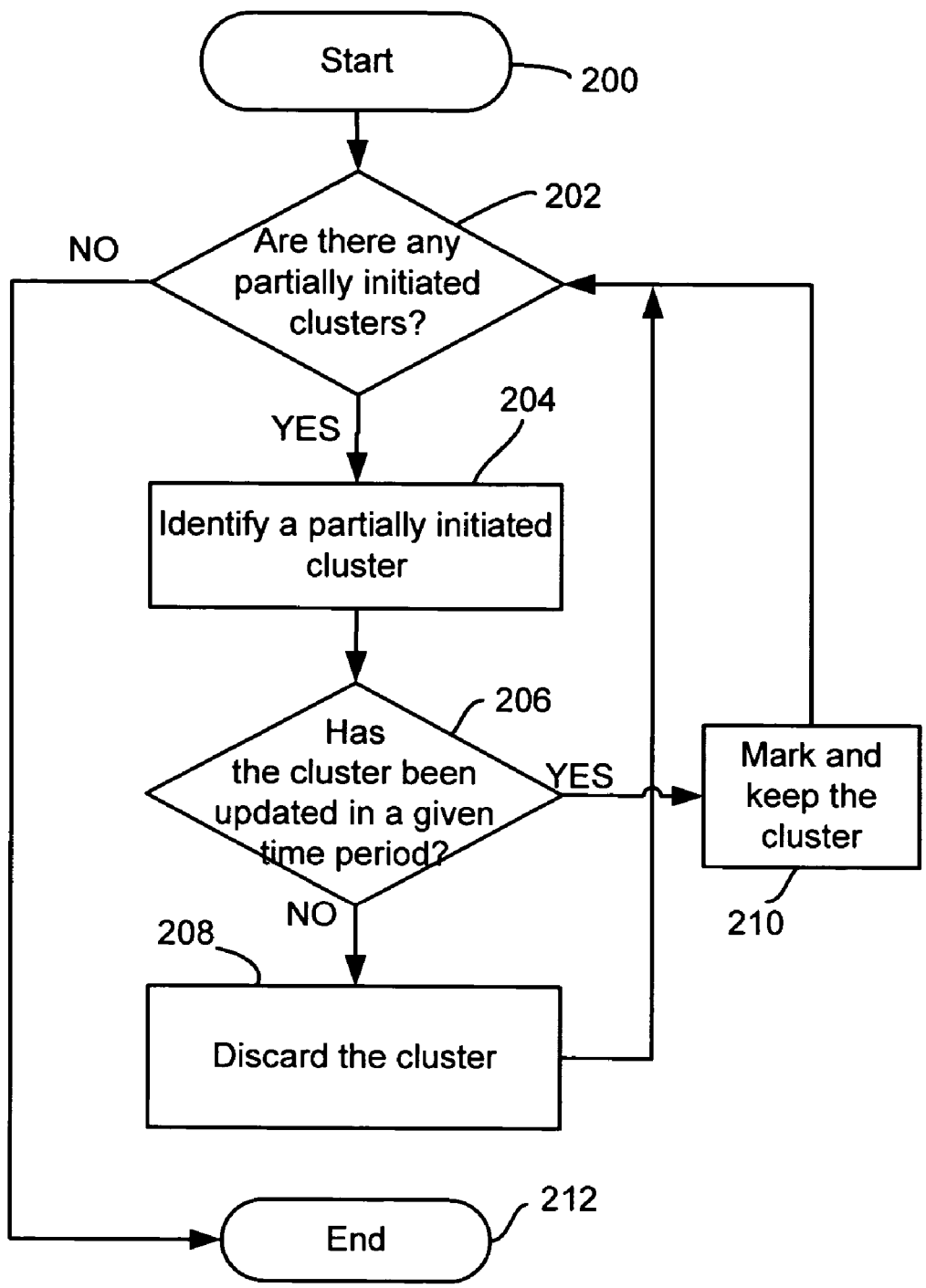
FIG. 2 is a flow chart illustrating a maintenance process for source address clusters in accordance with an embodiment of the present invention.

FIG. 2 is a flow chart illustrating a maintenance process for source address clusters in accordance with an embodiment of the present invention.

The maintenance of clusters typically takes place during low-traffic periods of the network. The exemplary process starts in step 200.

In step 202, it may be determined if there are any partially initiated clusters. A partially initiated cluster is an existing cluster that has not accumulated the required minimum number of packets to become a full cluster. If there is at least one partially initiated cluster, it may be identified in step 204. All the source addresses within the boundary of the cluster may also be identified.

In step 206, it may be determined whether the identified cluster has been updated in a given time period. If so, the cluster may be marked and retained in the data store. Otherwise, the cluster may be discarded. That is, all the source addresses within its boundary may be erased from the data store. If an hierarchical table is used in recording the source addresses and their cluster pointers, any sub-tables that do not contain any subnets may be deleted.

The process may go on until no out-dated clusters (partial or otherwise) are left, if the period of low traffic continues. Then the process may end in step 212.

Figure 3:
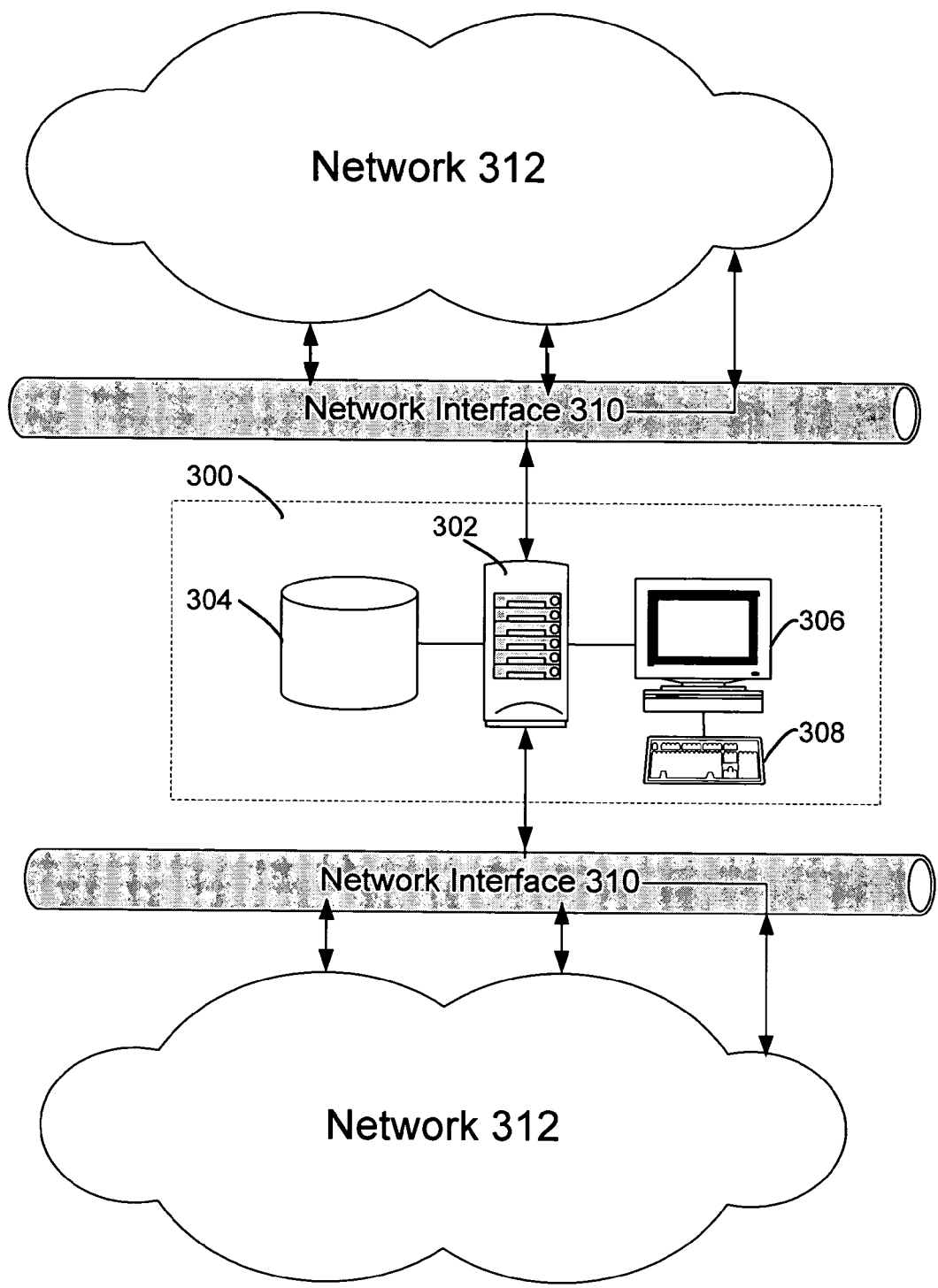
FIG. 3 is a block diagram illustrating an exemplary system for monitoring source addresses through statistical clustering of packets in accordance with an embodiment of the present invention.

Referring to FIG. 3, there is shown a block diagram illustrating an exemplary system (System 300) for monitoring source addresses through statistical clustering of packets in accordance with an embodiment of the present invention. System 300 may be any network element, such as a computer, a server, or a content-aware switch/router, that has packet processing and routing functions. System 300 may typically comprise a processor module 302 and a storage module 304. A display module 306 and input module 308 may be optional components in System 300. Processor module 302 may be a central processing unit (CPU), microcontroller, computer or network server that is operatively connected to a network 312 through a network interface 310. Processor module 302 may be capable of communicating with network 312, processing signal packets and routing signal packets. Storage module 304 may be a storage device, such as a semiconductor memory, nonvolatile memory, hard drive disk, CD-ROM or similar, that is accessible by processor module 302. Storage module 304 may hold a data store of source addresses of signal packets that have been received by processor module 302. Whenever a packet from network 312 arrives at System 300, processor module 302 may identify the packet's source address, query the data store in storage module 304, determine the legitimacy of the packet's source, and take action based on the above-described clustering algorithm in accordance with the invention.

The technique for monitoring source addresses through statistical clustering of packets in accordance with the present invention as described above may be implemented on a variety of network elements as a security feature, on top of which additional tools may be built to integrate with intrusion detection systems (IDS's) and network monitoring systems. The technique in accordance with the invention allows logging, alerting and/or disposal of suspect network traffic with minimal overhead cost or network disruption.

At this point it should be noted that the technique for monitoring source addresses through statistical clustering of packets in accordance with the present invention as described above typically involves the processing of input data and the generation of output data to some extent. This input data processing and output data generation may be implemented in hardware or software. For example, specific electronic components may be employed in a computer and/or communications network or similar or related circuitry for implementing the functions associated with statistical clustering of packets in accordance with the present invention as described above. Alternatively, one or more processors operating in accordance with stored instructions may implement the functions associated with statistical clustering of packets in accordance with the present invention as described above. If such is the case, it is within the scope of the present invention that such instructions may be stored on one or more processor readable carriers (e.g., a magnetic disk), or transmitted to one or more processors via one or more signals.

The present invention is not to be limited in scope by the specific embodiments described herein. Indeed, other various embodiments of and modifications to the present invention, in addition to those described herein, will be apparent to those of ordinary skill in the art from the foregoing description and accompanying drawings. Thus, such other embodiments and modifications are intended to fall within the scope of the following appended claims. Further, although the present invention has been described herein in the context of a particular implementation in a particular environment for a particular purpose, those of ordinary skill in the art will recognize that its usefulness is not limited thereto and that the present invention can be beneficially implemented in any number of environments for any number of purposes. Accordingly, the claims set forth below should be construed in view of the full breadth and spirit of the present invention as disclosed herein.

The invention claimed is:

1. A method for monitoring source addresses through statistical clustering of packets, the method comprising:
    identifying, via at least one processor module, at least part of a source address of a packet;
    searching at least one recorded source address in a data store based on the at least part of the source address, wherein the at least one recorded source address is organized in at least one hierarchical data structure and grouped into at least one cluster, wherein the at least one cluster includes a distribution of source addresses centered around a mean value;
    determining whether the at least one cluster contains at least a predetermined number of source addresses; and
    routing the packet if the at least part of the source address falls within one of the at least one cluster and the one of the at least one cluster contains at least a predetermined number of source addresses.

2. The method according to claim 1 further comprising discarding the packet if the one of the at least one cluster contains less than the predetermined number of source addresses.

3. The method according to claim 1 further comprising creating a new cluster centered around the at least part of the source address if the at least part of the source address does not fall within the one of the at least one cluster and discarding the packet if the at least part of the source address does not fall within any of the at least one cluster.

4. The method according to claim 1, wherein the at least one recorded source address is linked to the at least one cluster via pointers or references.

5. The method according to claim 1, wherein the at least part of the source address is within the one of the at least one cluster if the at least part of the source address is no more than two standard deviations away from the mean value of the one of the at least one cluster.

6. The method according to claim 1 further comprising updating the one of the at least one cluster by:
    including the at least part of the source address in the one of the at least one cluster;
    recalculating the mean value and a standard deviation for the one of the at least one cluster; and
    reorganizing the at least part of the source address and the at least one recorded source address based on the recalculated mean value and standard deviation.

7. The method according to claim 6 further comprising issuing a warning if the updated cluster has an increased standard deviation.

8. The method according to claim 6 further comprising limiting the standard deviation to be no less than a predetermined standard deviation value.

9. The method according to claim 8, wherein a new cluster is created based on the predetermined standard deviation value.

10. The method according to claim 1 further comprising discarding at least one of the at least one cluster, wherein the at least one of the at least one cluster contains less than the predetermined number of source addresses and has not been updated in a predetermined time period.

11. The method according to claim 1, wherein the source address of the packet is an Internet protocol (IP) address.

12. The method according to claim 11, wherein the at least one cluster has a minimum standard deviation value of 128.

13. The method according to claim 12, wherein a new cluster is created based on the minimum standard deviation value.

14. At least one non-transitory processor readable storage medium for storing a computer program of instructions configured to be readable by at least one processor for instructing the at least one processor to execute a computer process for performing the method as recited in claim 1.

15. A system for monitoring source addresses through statistical clustering of packets, the system comprising:
    at least one storage module that records at least one source address, wherein the at least one source address is organized in at least one hierarchical data structure and grouped into at least one cluster, wherein the at least one cluster includes a distribution of source addresses centered around a mean value; and
    at least one processor module that:
        identifies at least part of a source address of a packet;
        queries the storage module based on the at least part of the source address;
        determines whether the at least one cluster contains at least a predetermined number of source addresses; and
        routes the packet if the at least part of the source address falls within one of the at least one cluster and the one of the at least one cluster contains at least a predetermined number of source addresses.

16. The system according to claim 15, wherein the processor module further discards the packet if the one of the at least one cluster contains less than the predetermined number of source addresses.

17. The system according to claim 15, wherein the processor module further creates a new cluster centered around the at least part of the source address if the at least part of the source address does not fall within the one of the at least one cluster and discards the packet if the at least part of the source address does not fall within any of the at least one cluster.

18. A system for monitoring source addresses through statistical clustering of packets, the system comprising:

at least one processor module that:

identifies at least part of a source address of a packet;

searches at least one recorded source address in a data store based on the at least part of the source address, wherein the at least one recorded source address is organized into at least one cluster, wherein the at least one cluster includes a distribution of source addresses centered around a mean value;

determines whether the at least one cluster contains at least a predetermined number of source addresses; and routes the packet if the at least part of the source address falls within one of the at least one cluster and the one of the at least one cluster contains at least a predetermined number of source addresses.

\* \* \* \* \*